(12) United States Patent
Liu et al.

(10) Patent No.: US 11,993,542 B2
(45) Date of Patent: May 28, 2024

(54) MULTIFUNCTIONAL CEMENT HYDRATION HEAT CONTROL MATERIAL AND MANUFACTURING METHOD THEREFOR

(71) Applicants: Sobute New Materials Co., Ltd., Jiangsu (CN); Bote New Materials Taizhou Co., Ltd., Jiangsu (CN); ZHENJIANG SOBUTE NEW MATERIAL CO., LTD., Jiangsu (CN)

(72) Inventors: Jiaping Liu, Jiangsu (CN); Rui Wang, Jiangsu (CN); Qian Tian, Jiangsu (CN); Wenbin Wang, Jiangsu (CN); Lei Li, Jiangsu (CN); Yujiang Wang, Jiangsu (CN); Hua Li, Jiangsu (CN); Ting Yao, Jiangsu (CN); Yang Chu, Jiangsu (CN)

(73) Assignees: SOBUTE NEW MATERIALS CO., LTD., Jiangsu (CN); BOTE NEW MATERIALS TAIZHOU CO., LTD., Jiangsu (CN); ZHENJIANG SOBUTE NEW MATERIAL CO., LTD., Jiangsu (CN)

( * ) Notice: Subject to any disclaimer, the term of this patent is extended or adjusted under 35 U.S.C. 154(b) by 564 days.

(21) Appl. No.: 17/279,072

(22) PCT Filed: Nov. 14, 2019

(86) PCT No.: PCT/CN2019/118404
§ 371 (c)(1),
(2) Date: Mar. 23, 2021

(87) PCT Pub. No.: WO2020/215695
PCT Pub. Date: Oct. 29, 2020

(65) Prior Publication Data
US 2022/0073428 A1 Mar. 10, 2022

(30) Foreign Application Priority Data

Apr. 26, 2019 (CN) .......................... 201910345038.5

(51) Int. Cl.
| | | |
|---|---|---|
| C08F 216/08 | (2006.01) | |
| C04B 24/26 | (2006.01) | |
| C04B 28/02 | (2006.01) | |
| C08F 216/20 | (2006.01) | |
| C08F 220/06 | (2006.01) | |
| C08F 290/14 | (2006.01) | |
| C04B 103/00 | (2006.01) | |

(52) U.S. Cl.
CPC .......... *C04B 24/2694* (2013.01); *C04B 28/02* (2013.01); *C08F 290/142* (2013.01); *C04B 2103/006* (2013.01); *C04B 2103/0089* (2013.01)

(58) Field of Classification Search
CPC .......... C04B 24/2694; C04B 2103/006; C08F 290/062; C08F 216/02; C08F 216/04; C08F 216/08; C08F 216/1416; C08F 216/1433; C08F 216/1441; C08F 216/145; C08F 220/06
USPC .............................................. 525/63, 70, 88
See application file for complete search history.

(56) References Cited

U.S. PATENT DOCUMENTS

2019/0375683 A1* 12/2019 Yamakawa ........... C04B 24/383

FOREIGN PATENT DOCUMENTS

| CN | 101475339 A | 7/2009 |
|---|---|---|
| CN | 101659530 A | 3/2010 |
| CN | 102503217 A | 6/2012 |
| CN | 102887979 A | 1/2013 |
| CN | 103265201 A | 8/2013 |
| CN | 103980432 A | 8/2014 |
| CN | 104098288 B | 2/2016 |
| CN | 105712647 A | 6/2016 |
| CN | 104628296 B | 1/2017 |
| CN | 105060762 B | 1/2017 |
| CN | 107722191 A | 2/2018 |
| CN | 105039461 B | 8/2018 |
| CN | 109593167 A | 4/2019 |
| CN | 110041469 A | 7/2019 |
| JP | 2003034564 A | 2/2003 |

(Continued)

OTHER PUBLICATIONS

Wang et al., electronic translation of CN107722191, Feb. 2018.*

(Continued)

*Primary Examiner* — Michael J Feely
(74) *Attorney, Agent, or Firm* — McCoy Russell LLP

(57) ABSTRACT

Disclosed are a multifunctional cement hydration heat control material and a manufacturing method therefor. The cement hydration heat control material in is a comb polymer having three side chain structures, the three side chain structures are respectively a carboxyl group, a sugar alcohol group, and a polyether structure, and the main chain of the polymer is a carbon chain structure formed by free-radical polymerization of a double bond in a double bond compound monomer. The multifunctional cement hydration heat control material can achieve integration of cement hydration heat control performance, water reduction performance, and shrinkage reduction performance in a same molecule, can achieve control focusing on a performance by means of structural adjustment, does not need multi-component compounding during use, and is more convenient. The control material is non-toxic and water-soluble, can be made to have an appropriate concentration, and is convenient to use.

8 Claims, 3 Drawing Sheets

(56) References Cited

FOREIGN PATENT DOCUMENTS

| JP | 3729340 | B2 | 12/2005 |
| JP | 4905977 | B2 | 3/2012 |
| WO | 2005026223 | A1 | 3/2005 |

OTHER PUBLICATIONS

ISA China National Intellectual Property Administration, International Search Report Issued in Application No. PCT/CN2019/118404, dated Feb. 17, 2020, WIPO, 7 pages.

* cited by examiner

MULTIFUNCTIONAL CEMENT HYDRATION HEAT CONTROL MATERIAL AND MANUFACTURING METHOD THEREFOR

CROSS REFERENCE TO RELATED APPLICATIONS

The present application is a U.S. National Phase of International Application No. PCT/CN2019/118404 entitled "MULTIFUNCTIONAL CEMENT HYDRATION HEAT CONTROL MATERIAL AND MANUFACTURING METHOD THEREFOR", and filed on Nov. 14, 2019. International Application No. PCT/CN2019/118404 claims priority to Chinese Patent Application No. 201910345038.5, filed on Apr. 26, 2019. The entire contents of each of the above-listed applications are hereby incorporated by reference for all purposes.

TECHNICAL FIELD

The present disclosure relates to a multifunctional cement hydration heat control material and a manufacturing method for the same, belonging to the category of admixtures in the field of chemical building materials.

BACKGROUND AND SUMMARY

Cement concrete is the building material that is mostly used in the world, and is widely applied in municipal, bridge, railway, water conservancy, hydropower and other fields. As an artificial stone, cement concrete has the advantages such as high strength, strong plasticity and low price. As a porous material, the cement concrete has the characteristics of good thermal insulation and poor thermal conductivity. With the development of large-volume, super-high-rise and super-long buildings, the high-strength cement concrete is highly demanded, the water-binder ratio continues to decrease, and the heat release caused by cement hydration increases. Though the concrete strength is satisfied, the temperature shrinkage caused by temperature rise is aggravated.

In order to meet the demand for a low water-binder ratio in construction and reduce temperature shrinkage, water reducer can be used in concrete production. In addition, measures such as reducing cement consumption, replacing cement with a large amount of supplementary cementitious materials and burying cooling water pipes are commonly adopted in practical engineering to lower the risk of thermal cracks. Regarding the water reducer, the polycarboxylate water reducer is the focus of research and widely used at present due to its high water reducing rate, adjustable structure and low price.

CN101475339A discloses a polycarboxylic water reducer, which is copolymerized by (methyl) acrylic acid, ether-bonded unsaturated polyether monomer and ester-bonded unsaturated polyether monomer, and has the characteristics of low admixture content, good dispersibility and strong adaptability. CN101659530A discloses polycarboxylic acid obtained by copolymerization of unsaturated compounds such as unsaturated phosphonate monomer, which has the characteristics of resistance to $SO_4^{2-}$ and temperature. As for the reduction of cement hydration heat, concrete hydration heat control materials can adjust the cement hydration process, reduce hydration heat release rate and reduce the risk of temperature cracking. JP3729340B2 and JP4905977B2 disclose a product technology using dextrin as a main body, in which the hydration heat release of the cement can be controlled by controlling its solubility in cold water. CN104098288B, CN104628296B, CN105039461B, and CN105060762B disclose methods for preparing hydration heat control materials by enzyme- or acid-catalyzed hydrolysis. The polycarboxylate water reducer is usually used in the form of solution, and the hydration heat control materials are generally used in the form of powder. In practical engineering applications, in order to meet the requirements for strength and temperature, it is necessary to add a water reducer and a hydration heat control material at the same time to reduce the water-binder ratio and structural temperature rise. Except sand, stone and cementing materials, the conventional concrete production system does not have the equipment to add extra liquids and powders at the same time. Thus, additional equipment is required, which brings inconvenience to concrete production and increases the investment of the equipment and site.

SUMMARY

In view of the diverse requirements for the concrete, the present disclosure provides a multifunctional cement hydration heat control material and a manufacturing method therefor, by which the functions of reducing the cement hydration rate, water consumption and temperature shrinkage are integrated into one type of compound structures, thereby improving the convenience of use. The cement hydration heat control material provided by the present disclosure has the functions of reducing the hydration rate during the accelerated period of cement hydration as well as reducing water and temperature shrinkage reduction, which enables this material to be widely applicable and especially suitable for pouring concrete for the construction of concrete structure with large volume, ultra-long length and strong constraint.

The present disclosure provides a multifunctional material for controlling cement hydration heat. The multifunctional material for controlling cement hydration heat is a comb-shaped polymer with three kinds of side chain structures, and the three kinds of side chain structures are carboxyl groups, alditol groups, polyalkylene glycols, respectively; and a backbone of the polymer is a carbon chain structure formed through free radical polymerization of double bonds in double-bond compound monomers.

The multifunctional material for controlling cement hydration heat according to the present disclosure is prepared by free radical polymerization of monomers A, B, and C; the monomer A is a (methyl) acrylic acid (acrylate) monomer, the monomer B is a double-bond compound with one alditol group, and the monomer C is unsaturated polyether; and a weight-average molecular weight of the material for controlling cement hydration heat ranges from 10000 to 100000.

The monomer A has a structure represented by a general formula (1):

(1)

in which $R_1$ is methyl or H, and M is H or an alkali metal; the monomer B has a structure represented by a general formula (2):

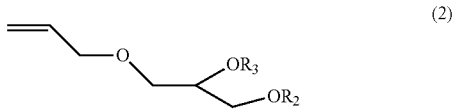

in which $R_2$ and $R_3$ are independently selected from a hydrogen atom and an alditol group, and $R_2$ and $R_3$ are not both hydrogen atoms, or are not both alditol groups; and the monomer C has any one of three structures represented by a general formula (3):

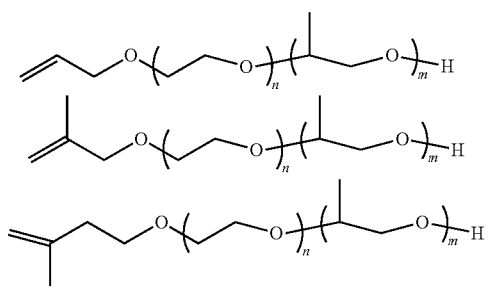

in which n and m are each 0 or a positive integer, and m and n are not 0 at the same time; and a weight-average molecular weight of the monomer C ranges from 500 to 10000.

The multifunctional material for controlling cement hydration heat has a structure represented by a general formula (4):

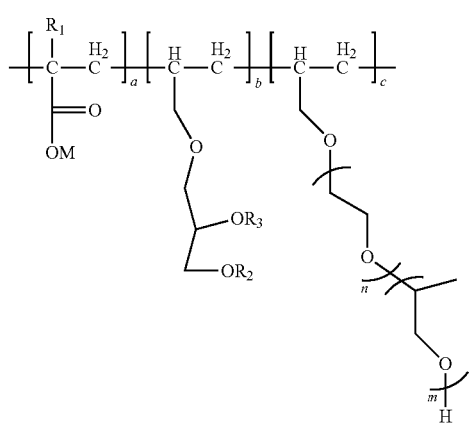

in which a, b and c are natural integers; M is H, Na or K.

The monomer B is a compound or a mixture formed by a ring-opening addition reaction of allyl glycidyl ether and an alditol compound in a molar ratio of 1:1, and the alditol compound is selected from the group consisting of sorbitol, xylitol, mannitol, erythritol, lactitol, maltitol, and combinations thereof in any proportion.

The monomer C is formed by ring-opening polymerization of olefinic alcohol and epoxy alkane in any proportion, wherein the epoxy alkane is any one of epoxy ethane, epoxy propane, or a mixture thereof in any proportion; when the epoxy alkane contains epoxy ethane and epoxy propane, the monomer C is prepared by ring-opening polymerization of olefinic alcohol with epoxy ethane and then with epoxy propane in any proportion, and neither m nor n is 0; when the monomer C is formed by ring opening polymerization of olefinic alcohol and epoxy ethane, m is 0; and when the monomer C is prepared by ring opening polymerization of olefinic alcohol and epoxy propane, n is 0; and the olefinic alcohol has any one of the structures represented by a general formula (5):

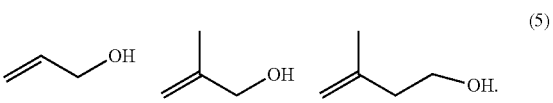

A method for preparing the multifunctional material for controlling cement hydration heat according to the present disclosure comprises the following steps: performing free radical polymerization of the monomer A, B, and C in water in presence of an initiator and a chain transfer agent, wherein a total weight of the monomer A, the monomer B and the monomer C accounts for 20% to 50% of a weight of a whole reaction system.

The initiator may be any one of ammonium persulfate, sodium persulfate or potassium persulfate or a mixture thereof in any proportion; the initiator may also be a redox system, with an oxidant being hydrogen peroxide and a reductant agent being alkali metal sulfite or ascorbic acid; a mass of the initiator is 0.5% to 2.0% of the total weight of the monomer A, the monomer B, and the monomer C.

The chain transfer agent is mercaptoethanol or mercaptoacetic acid, and a mass of the chain transfer agent is 0% to 1.0% of the total weight of the monomer A, the monomer B and the monomer C.

According to the technical concept of the present disclosure, several functional cement concrete admixtures, including water reducer, slump retaining agent, air entraining agents and retarder, can be prepared by modifying the structural formula. The multifunctional cement hydration heat control material prepared by the present disclosure can realize the integration of cement hydration heat inhibition performance, water-reducing performance and shrinkage-reducing performance in the same molecule. By adjusting the structure of molecule, the abovementioned performances can be specifically controlled, so that it is unnecessary to compound multiple components, and the method is more convenient. The control material according to the present disclosure is nontoxic and water-soluble. It can be prepared at proper concentrations, which is convenient to use.

DETAILED DESCRIPTION OF EMBODIMENTS

Figure 1:
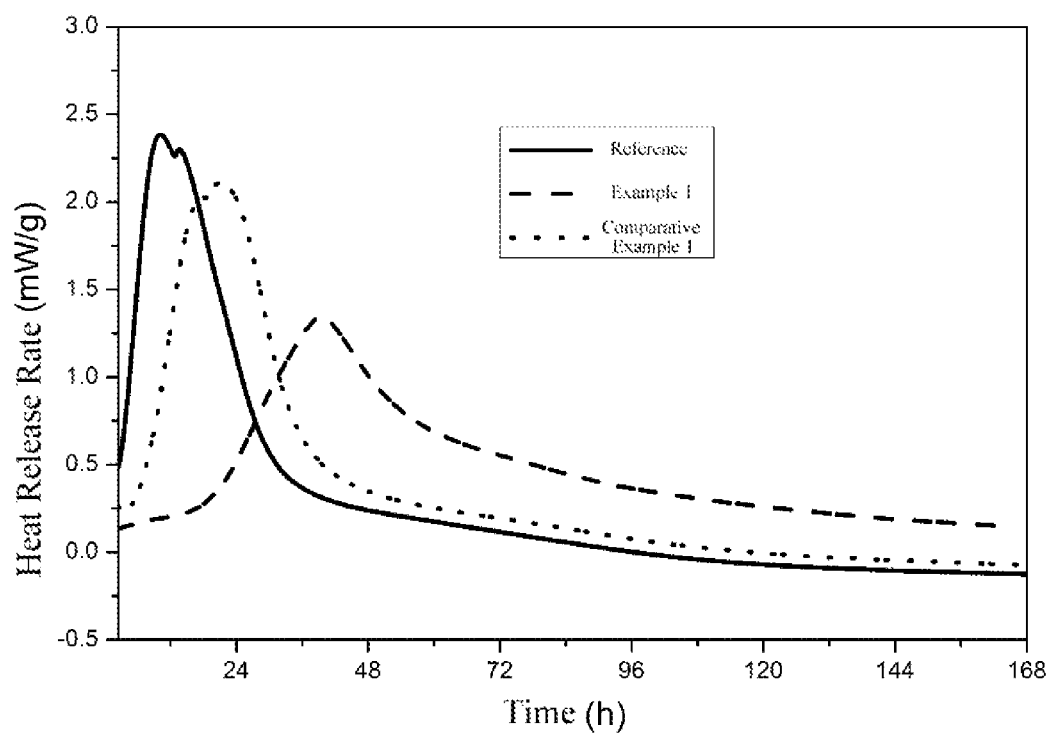
FIG. 1 illustrates results of evaluation on cement hydration heat release rate of cement hydration heat control materials prepared in Example 1 and Comparative Example 1.

In order to better understand the present disclosure, it will be further explained with examples below. However, the present disclosure shall not be limited to the scope defined by these examples. All monomers in the embodiments of the present disclosure can be purchased commercially, or can be prepared according to the conventional operations in the field as described in the present disclosure. Molecular weight of the product of the present disclosure is a weight-average molecular weight measured by a gel permeation chromatograph instrument. In product performance test of the present disclosure, the cement is a reference cement meeting the requirements under GB8076, a fluidity test of cement paste is carried out according to GB8077 with 87 g water added; a 7-day shrinkage rate test of mortar is carried out according to JC/T 2361-2016; the hydration heat performance is obtained by a TAM-AIR isothermal calorimeter (TA Instruments, USA) measuring the hydration heat release rate of the cement over time, the test temperature is 20° C., the test object is cement paste, and the water-binder ratio is 0.4.

Example 1

1) Preparation of a monomer $B_1$: 0.1 mol (11.4 g) of allyl glycidyl ether and 0.1 mol of mannitol were blended. A ring-opening addition reaction was carried out under the action of an alkaline catalyst at a high temperature to obtain 0.1 mol of a mannitol-based monomer $B_1$. 2) Preparation of the multifunctional cement hydration heat control material: 0.1 mol of the above monomer $B_1$, 0.1 mol of methacrylic acid (monomer $A_1$, where $R_1$ was methyl), 0.2 mol of polyethylene glycol monoallyl alcohol ether (monomer $C_1$, with a weight-average molecular weight about 500, where n=10, m=0), and mercaptoethanol accounting for 0.5% of the total mass of the three monomers were prepared as an aqueous solution, which was vacuumized and replaced by nitrogen for several times; the temperature was raised to 80° C., an aqueous solution of ammonium persulfate was added dropwise while stirring. Afterwards, the temperature was kept for 2 h. The solution was then cooled to the room temperature, an alkali was added to neutralize the solution to a pH value of 7.4, thus obtaining the multifunctional cement hydration heat control material with a weight-average molecular weight of 15,000 (Example 1).

Example 2

1) Preparation of monomer B2: 0.1 mol (11.4 g) of allyl glycidyl ether, 0.05 mol of sorbitol and 0.05 mol of lactitol were blended, and a ring-opening addition reaction was carried out under the action of an alkaline catalyst at a high temperature to obtain 0.1 mol of an alditol-based monomer $B_2$. 2) Preparation of a multifunctional cement hydration heat control material: 0.1 mol of the above monomer $B_2$, 0.2 mol of sodium acrylate (monomer $A_2$, where $R_1$ was H), 0.25 mol of polypropylene glycol monoisoamylene alcohol ether (monomer $C_2$, with a weight-average molecular weight about 5000, where n=86, m=20), mercaptoethanol accounting for 1.0% of the total mass of the three monomers, and 0.5% hydrogen peroxide were prepared as an aqueous solution, which was vacuumized and replaced by nitrogen for several times; the temperature was raised to 40° C., an aqueous solution of ascorbic acid with the same molar amount as hydrogen peroxide was added dropwise while stirring, and afterwards, the temperature was kept for 2 h. The solution was then cooled to the room temperature, thus obtaining the multifunctional cement hydration heat control material with a weight-average molecular weight of 100,000 (Example 2).

Example 3

1) Preparation of a monomer $B_3$: 0.1 mol (11.4 g) of allyl glycidyl ether, 0.02 mol of mannitol, 0.02 mol of xylitol, and 0.06 mol of maltitol were blended, and a ring-opening addition reaction was carried out under the action of an alkaline catalyst at a high temperature to obtain 0.1 mol of an alditol-based monomer $B_3$. 2) Preparation of a multifunctional cement hydration heat control material: 0.1 mol of the above monomer $B_3$, 0.05 mol of acrylic acid, 0.01 mol of potassium methacrylate (monomer $A_3$, where $R_1$ was methyl), 0.05 mol of polypropylene glycol monoisobutylene alcohol ether (monomer $C_3$, with a weight-average molecular weight about 1000, where n=0, m=16), and thioglycolic acid accounting for 0.2% of the total mass of the three monomers were prepared as an aqueous solution, which was vacuumized and replaced by nitrogen for several times; the temperature was raised to 80° C., an aqueous solution of sodium persulfate was added dropwise while stirring, and afterwards, the temperature was kept for 2 h; the solution was then cooled to the room temperature, and an alkali was added to neutralize the solution to a pH value of 7.4, thus obtaining the multifunctional cement hydration heat control material with a weight-average molecular weight of 80,000 (Example 3).

Comparative Example 1

In the preparation of the multifunctional cement hydration heat control material in Example 1, the monomer Blin the above reaction was replaced by an equal molar amount of allyl glycerol ether, while other conditions kept unchanged, and a copolymer was prepared.

Comparative Example 2

In the preparation of the multifunctional cement hydration heat control material in Example 2, the monomer $B_2$ in the above reaction was replaced by an equal molar amount of allyl glycerol ether, while other conditions kept unchanged, and a copolymer was prepared.

Comparative Example 3

In the preparation of the multifunctional cement hydration heat control material in Example 3, the monomer $B_3$ in the above reaction was replaced by an equal molar amount of allyl glycerol ether, while other conditions kept unchanged, and a copolymer was prepared.

Comparative Example 4

With reference to Japanese Patent JP2003034564A, a starch-based compound with a solubility of 6% in water at 50° C. and 40% in water at 80° C. was prepared.

With the same dosage (an effective content of copolymer accounts for 0.2% of the cement weight) of the multifunctional cement hydration heat control materials according to the present disclosure and the control materials prepared in respective comparative examples, the fluidity of the cement paste and the shrinkage reduction performance of the mortar are shown in Table 1 below. The fluidity of the reference cement paste was only 70 mm, indicating no fluidity. In contrast, the fluidity of the paste added with the samples of the examples of the present disclosure and comparative examples was obviously increased to over 200 mm, indicating significant water reducing property of this structure.

At the same time, due to the different structures of polyether segments, the 7-day shrinkage reduction rate of mortar shows obvious shrinkage reduction characteristics by adding different samples varies, and the copolymer containing polyether with a side chain and a polypropylene glycol structure. However, the starch-based compound prepared according to Japanese Patent JP2003034564A had negligible effect on the fluidity of the cement paste and the 7-day shrinkage reduction rate of the mortar.

TABLE 1

Test Performance

| Samples | No Copolymer | Example 1 | Comparative Example 1 | Example 2 | Comparative Example 2 | Example 3 | Comparative Example 3 | Comparative Example 4 |
|---|---|---|---|---|---|---|---|---|
| Fluidity of the cement paste/mm | 70 | 240 | 235 | 220 | 215 | 205 | 205 | 75 |
| 7-day shrinkage reduction rate of mortar/% | 0 | 5 | 5 | 35 | 32 | 25 | 20 | 0 |

Figure 2:
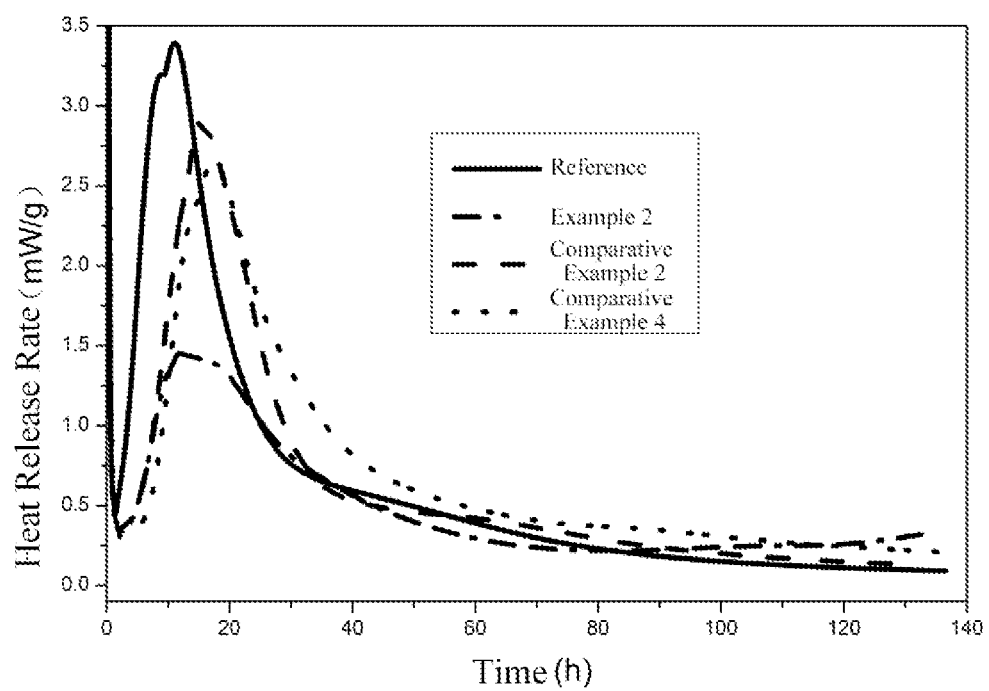
FIG. 2 illustrates results of evaluation on cement hydration heat release rate of cement hydration heat control materials prepared in Example 2 and Comparative Example 2 as well as Comparative Example 4.
Figure 3:
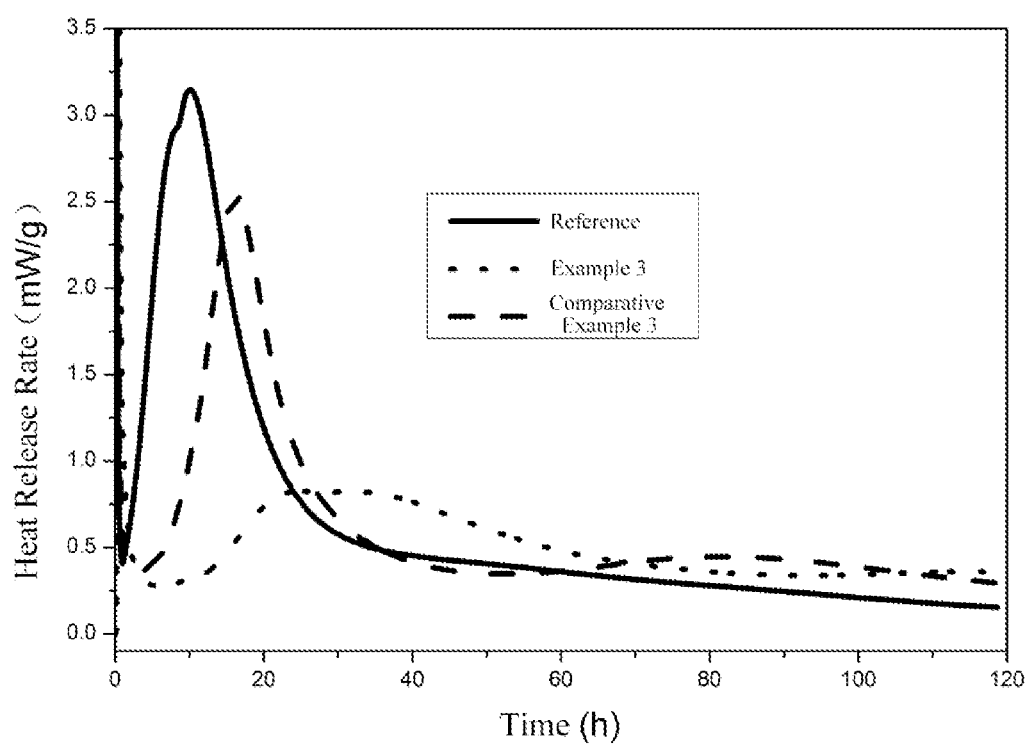
FIG. 3 illustrates results of evaluation on cement hydration heat release rate of cement hydration heat control materials prepared in Example 3 and Comparative Example 3.

With the same dosage (the effective content of the copolymer accounts for 0.25% of the cement weight) of the multifunctional hydration heat control materials prepared in the examples of the present disclosure and comparative examples, the hydration heat release rate performance of the cement at 20° C. is shown in FIG. 1, FIG. 2 and FIG. 3. FIG. 1 illustrates the heat release rates of the paste mixed with the samples in Example 1 and Comparative Example 1 to characterize the influence of the products on cement hydration. The heat release rate of the reference paste (without any sample) increases rapidly after adding water, and reaches the peak value (about 2.4 mW/g) quickly; the heat release rate curve of the paste mixed with the sample according to the Comparative Example 1 also rises rapidly after a relatively short induction period, and quickly reaches the peak value (about 2.2 mW/g), this value is slightly lower than the reference sample; regarding the paste doped with the sample of Example 1 of the present disclosure, the time taken to reach the peak heat release is relatively long, and the peak value of the heat release rate is significantly reduced to around 1.4 mW/g. Compared with the peak values of the reference group and those of the comparative examples, this number is decreased by more than 35% showing an obvious effect on controlling the hydration heat of cement hydration. At the same time, during the temperature drop stage, the three curves are different, and the temperature drop rates decrease in a sequent of reference group, the Comparative Example 1 group, and the Example 1 group, indicating that the technology described in the present disclosure can also adjust the performance of the cement in the later stage of hydration heat release. With reference to FIG. 2, the hydration rate curves of different groups of the paste reveals that, compared with the reference group, the peak hydration rate of the Comparative Example 2 group decreases by 14%, the peak hydration rate of the comparative example 4 group related to the Japanese Patent decreases by 24%, and the peak hydration rate of the Example 2 group of the present disclosure decreased by 58%; from the declining stage of the hydration rate curve, the hydration rate curve of the cement of Comparative Example 2 is basically the same as the reference group, and the hydration rate of the cement decreases rapidly, while the curve of comparative example 4 in Japanese patent technology is slightly gentle, the hydration rate decreases slowly, and the hydration rate in the Example 2 of the present disclosure is the slowest. As shown in FIG. 3, compared with the reference group, the peak hydration rate of Comparative Example 3 group decreases by 19%, and the peak hydration rate of Example 3 group decreases by 74%; in the hydration rate decreasing stage, the decrease in the Example 3 of the present disclosure is obviously less than that in the reference group and the comparative example groups, meanwhile the comparative example groups are basically consistent with the reference group.

In conclusion, on basis of the results of the cement paste fluidity, 7-day shrinkage reduction rate of the mortar, and cement hydration heat release rate, the present disclosure can realize multiple functions including water reduction, shrinkage reduction and hydration heat control.

The invention claimed is:
1. A multifunctional material for controlling cement hydration heat, wherein the material for controlling cement hydration heat is a comb-shaped polymer with three kinds of side chain structures, and the three kinds of side chain structures are carboxyl groups, alditol groups, polyalkylene glycols, respectively; and a backbone of the polymer is a carbon chain structure formed through free radical polymerization of double bonds in double-bond compound monomers,
wherein the multifunctional material for controlling cement hydration heat is prepared by free radical polymerization of monomers A, B, and C; the monomer A is a (methyl) acrylic acid (acrylate) monomer, the monomer B is a double-bond compound with one alditol group, and the monomer C is unsaturated polyether; and a weight-average molecular weight of the material for controlling cement hydration heat ranges from 10000 to 100000,
wherein the monomer A has a structure represented by a general formula (1):

wherein $R_1$ is methyl or H, and M is H or an alkali metal elements;
the monomer B has a structure represented by a general formula as described below (2):

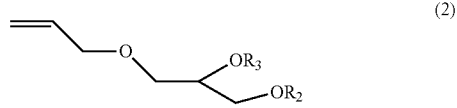
(2)

wherein $R_2$ and $R_3$ are each independently selected from a hydrogen atom or an alditol group, and $R_2$ and $R_3$ are identical to each other; and the monomer C has any one of three structures represented by a general formula (3):

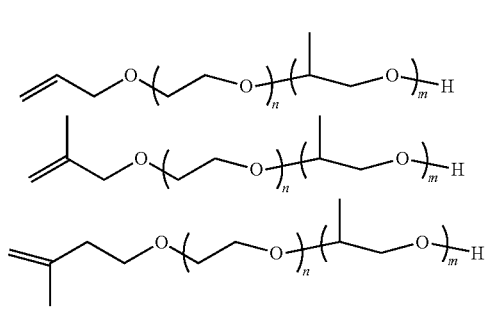
(3)

wherein n and m are each 0 or a positive integer, and m and n are not 0 at the same time; and a weight-average molecular weight of the monomer C ranges from 500 to 10000.

2. The multifunctional material for controlling cement hydration heat as claimed in claim 1, wherein the multifunctional material for controlling cement hydration heat has a structure represented by a general formula (4):

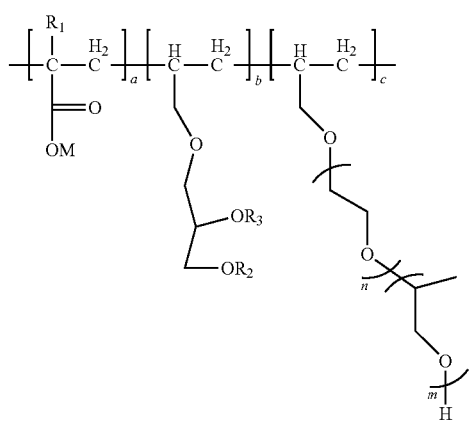
(4)

wherein a, b and c are positive integers.

3. The multifunctional material for controlling cement hydration heat as claimed in claim 2, wherein the M is H, Na, or K.

4. The multifunctional material for controlling cement hydration heat as claimed in claim 1, wherein the monomer B is a compound or a mixture formed by a ring-opening addition reaction of allyl glycidyl ether and an alditol compound in a molar ratio of 1:1, and the alditol compound is selected from the group consisting of sorbitol, xylitol, mannitol, erythritol, lactitol, maltitol, and combinations thereof in any proportion.

5. The multifunctional material for controlling cement hydration heat as claimed in claim 1, wherein the monomer C is formed by ring-opening polymerization of olefinic alcohol and epoxy alkane in any proportion, wherein the epoxy alkane is any one of epoxy ethane, epoxy propane, or a mixture thereof in any proportion;

when the epoxy alkane contains epoxy ethane and epoxy propane, the monomer C is prepared by ring-opening polymerization of olefinic alcohol with epoxy ethane and then with epoxy propane in any proportion, and neither m nor n is 0;

when the monomer C is formed by ring opening polymerization of olefinic alcohol and epoxy ethane, m is 0; and when the monomer C is prepared by ring opening polymerization of olefinic alcohol and epoxy propane, n is 0; and the olefinic alcohol has any one of the structures represented by a general formula (5):

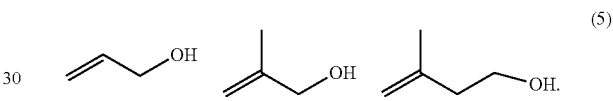
(5)

6. A method for preparing the multifunctional material for controlling cement hydration heat as claimed in claim 1, the method comprising the following steps:

performing free radical polymerization of the monomer A, B, and C in water in presence of an initiator and a chain transfer agent, wherein a total weight of the monomer A, the monomer B and the monomer C accounts for 20% to 50% of a weight of a whole reaction system;

a mass of the initiator ranges from 0.5% to 2.0% of the total weight of the monomer A, the monomer B, and the monomer C; and the chain transfer agent is mercaptoethanol or mercaptoacetic acid, and a mass of the chain transfer agent ranges 0% to 1.0% of the total weight of the monomer A, the monomer B and the monomer C.

7. The method for preparing the multifunctional material for controlling cement hydration heat as claimed in claim 6, wherein the initiator is any one of ammonium persulfate, sodium persulfate, potassium persulfate, or a mixture thereof in any proportion.

8. The method for preparing the multifunctional material for controlling cement hydration heat as claimed in claim 6, wherein the initiator is a redox system, in which an oxidant is hydrogen peroxide, and a reductant agent is alkali metal sulfite or ascorbic acid.

* * * * *